United States Patent [19]

Failes

[11] 4,080,072
[45] Mar. 21, 1978

[54] ADDITIVE LAMPHOUSE FOR CONTACT PRINTING

[75] Inventor: Michael Failes, Mississauga, Canada

[73] Assignees: Canadian Instrumentation and Research Limited, Mississauga; Film Opticals of Canada Limited, Toronto, both of Canada

[21] Appl. No.: 648,123

[22] Filed: Jan. 12, 1976

[51] Int. Cl.² .......................................... G03B 27/04
[52] U.S. Cl. ...................................... 355/88; 355/32; 355/71; 355/132
[58] Field of Search .................. 355/32, 35, 36, 71, 355/80, 83, 88, 132

[56] References Cited

U.S. PATENT DOCUMENTS

| | | | |
|---|---|---|---|
| 1,935,422 | 11/1933 | Vidal | 355/88 |
| 2,024,522 | 12/1935 | Harrison | 355/88 X |
| 2,052,625 | 9/1936 | Harrison | 355/88 X |
| 2,741,944 | 4/1956 | Gunther | 355/35 |
| 2,780,155 | 2/1957 | Debrie | 355/88 |
| 3,075,432 | 1/1963 | Myers | 355/88 UX |
| 3,260,152 | 7/1966 | Aston | 355/35 |
| 3,521,954 | 7/1970 | French | 355/80 |

*Primary Examiner*—Fred L. Braun
*Attorney, Agent, or Firm*—George H. Riches and Associates

[57] ABSTRACT

A novel device for use as an additive lamphouse in contact printing. White light is emitted by a source, collimated and then passed through a dispersion element to form a spectrum. The light is then selectively attenuated by wavelength to allow exact control of the color mixture of the light which falls on the negative and the positive contact. The use of a dispersion element rather than the dichroic principle of the prior art allows selective control of the color mixture of the light incident to the negative and thus to the contact by providing an improved control of the homogenuity of the color across the illuminated field. Also the problem of "color wedging" has been markedly reduced. The contact printer according to the present invention is more compact than those of the prior art and may be produced at a reduced cost.

35 Claims, 8 Drawing Figures

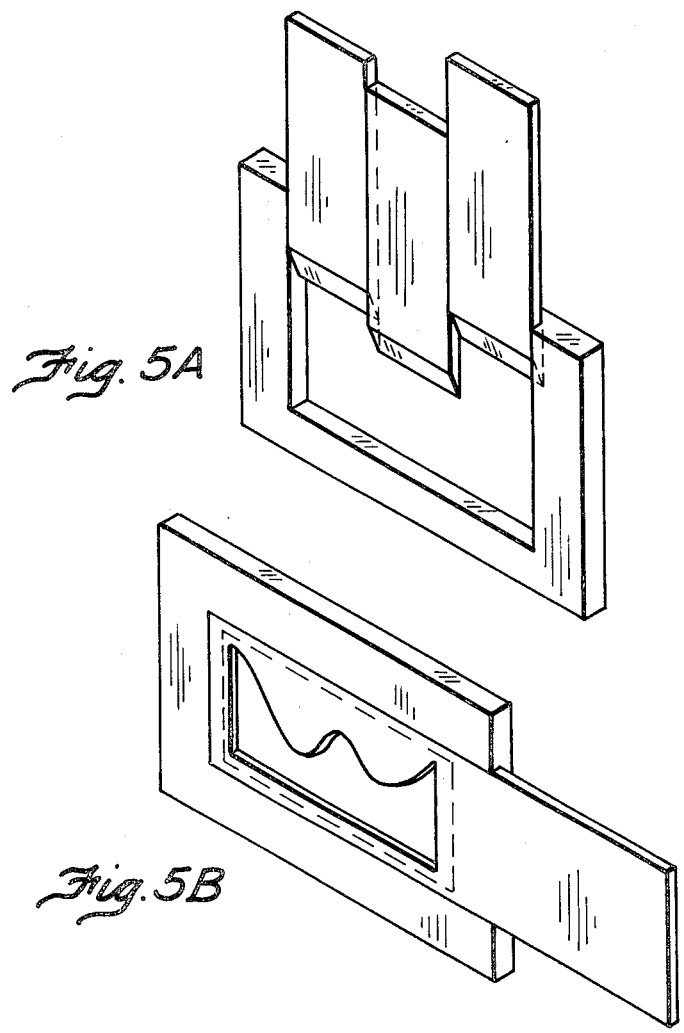
Fig. 5A
Fig. 5B
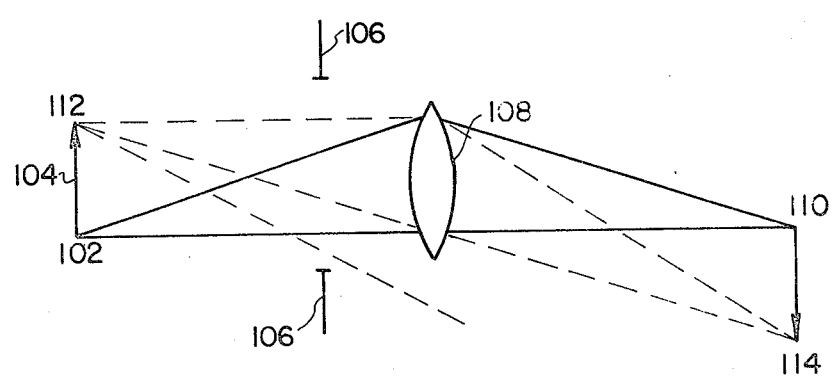
Fig. 6

ADDITIVE LAMPHOUSE FOR CONTACT PRINTING

BACKGROUND OF THE INVENTION

1. Field of the Invention

This invention relates to optics and in particular, to an improved additive lamphouse for contact printing.

2. Description of the Prior Art

In a contact printer, the to-be-exposed material (hereinafter referred to as the contact) is exposed in contact with a negative and the light passes through the back of the negative to the coated side of the contact. The emulsion side of the negative is placed facing the emulsion side of the contact and the two are placed in contact at all points. The various parameters of the incident light will therefore affect the print produced as a contact print. It is therefore important to be able to control the incident light on the negative if one wishes to be able to produce the desired print.

The light used as a source for contact printers may be produced in an additive lamphouse. These devices emit a light and provide certain controls over the light prior to the exposure of the negative and the positive or negative contact. However, the controls which one can exercise over this light source have been limited as explained hereinafter and the contacts produced therefore have suffered from certain drawbacks and disadvantages.

In the past, additive lamphouses have had certain limitations with respect to their structure and their ability to reproduce quality images. Additive colour lamphouses are used to illuminate the negative and the contact during the exposure thereof in the contact printing process wherein the colour of the incident light on the negative is particularly important.

An example of a situation in which the colour of the incident light is very important is as follows. During the filming of a movie, it has been found that it may take a considerable length of time to film a sequence of events which ultimately may involve a very short period of time in the final product. If the shooting of a particular scene occurs over a period of time in which various lighting conditions occur, such as during the afternoon hours when the daylight becomes redder with time, and that scene is intended to occur over a much shortened period of time in the final movie, it is desired to stabilize the colour of the print produced to properly represent a short period of time. Thus, the colour in the final print may remain constant to provide the viewer with the proper perspective of time lapse.

These particular changes in the colour of the images on the original film must be stabilized by the changes in the colour of the illumination when the film or the print (contact) is produced as a final product.

One of the particular advantages of the lamphouse of the present application is its ability to adjust and control the colour of the contact produced. Compensations can be made during the process to produce constant lighting conditions in the printing stage to reflect the desired results.

The present invention will be disclosed for use in association with a contact printer but is adaptable for use in any device wherein an additive lamphouse may be used.

BRIEF DESCRIPTION OF THE DRAWINGS

The invention will be described in the following description taken together with the accompanying drawings in which:

FIGS. 5A and 5B are representations of two embodiments of a spectrum attenuator suitable for use in the present invention.

FIG. 6 is a schematic representation of the principle of vignetting.

The lamphouses of the prior art have been based upon the use of mirrors. The mirrors used in the devices of the prior art may be of any type with appropriate reflecting surfaces. The most common type used in contact printers are dichroic mirrors and the devices of the prior art will be explained in relation to a device utilizing dichroic mirrors.

Figure 1:
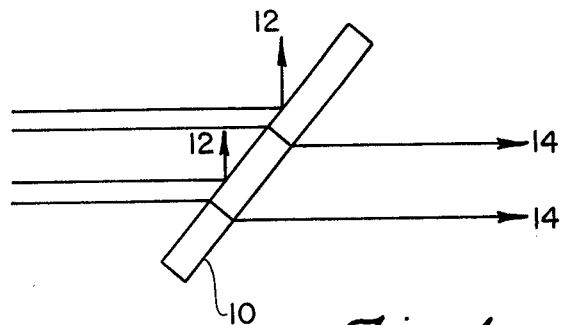
FIG. 1 is a schematic representation of the principle of a dichroic mirror.

A dichroic is a wavelength (colour) selective reflector/transmitter which is produced by using multilayer dielectric films. As seen in FIG. 1, a single dichroic mirror 10 may be made to reflect red light 12 and to transmit blue light 14.

Figure 2:
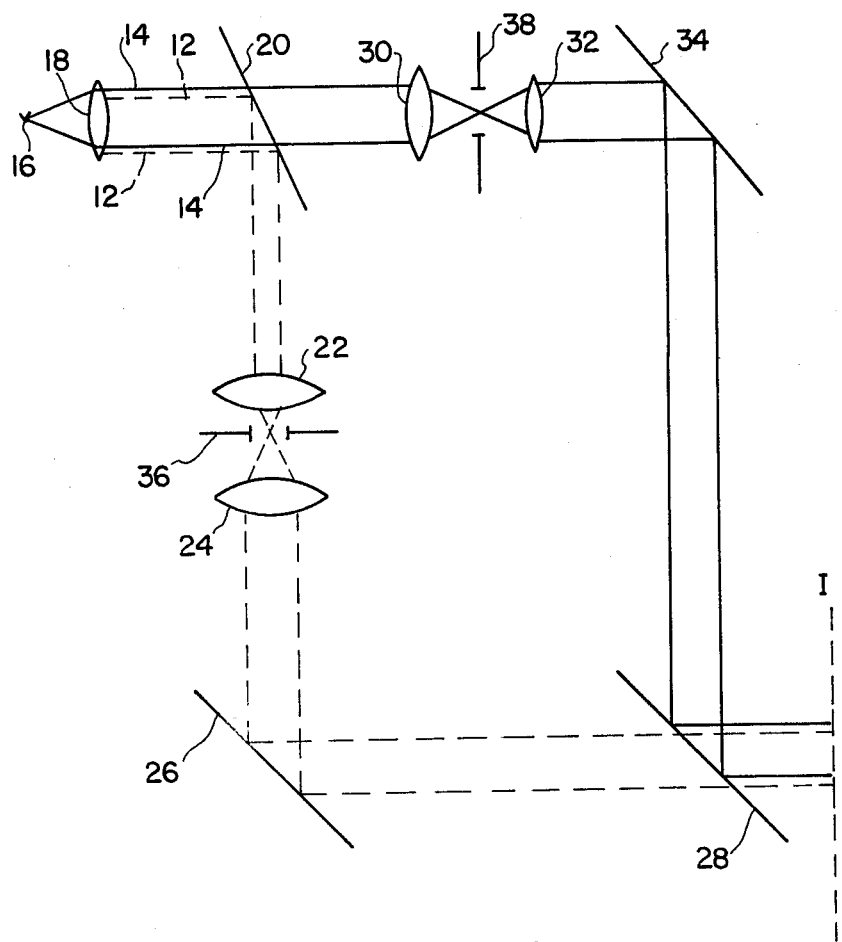
FIG. 2 is a schematic representation of a simple additive lamphouse of the prior art.

A simple lamphouse of the prior art using the principle of dichroics is illustrated in FIG. 2.

In FIG. 2, light source 16 emits light to a first lens 18 which transmits the red light 12 and blue light 14 to the first dichroic mirror 20. The red light 12 is reflected through lens 22, 24 to a dichroic mirror 26 through a dichroic mirror 28 to image I. The blue light 14 is transmitted through a dichroic mirror 20 to lens 30, 32 and is reflected by dichroic mirror 34, then reflected by a dichroic mirror 28 to the image I.

Selective attenuation of the source image at the stop gaps 36 and 38 control the amount of blue and red light which emerge at image I. If one were to add a green channel, a three colour control unit is obtained.

The use of dichroic mirrors in the selective attenuation of the light has notable disadvantages. Dichroics will only attenuate light in a limited number of bands and that limit is controlled by the number of dichroics in the system.

Also, as seen by FIG. 2, the use of dichroics necessitates a rather complicated structure and increases the expense of the process.

FIG. 2 is drawn only to demonstrate the colour splitting and recombination of the colours and is not intended as a representation of an actual additive lamphouse device. It illustrates the control of colour separation and colour mixing as applied to devices of the prior art.

Thus, it has become very difficult to exercise exact control over the attenuation of the light used in contact printing. If a system were designed to give better control of the light used in the exposure, then better quality contacts would be produced.

It has further been found that dichroics change their reflection/transmission characteristics with their angle of incidence. Thus, a large source of light has an image which itself shows a colour variation across itself. This problem of "colour wedging" occurs across the illumination aperture and is quite apparent in the devices of the prior art.

SUMMARY OF THE INVENTION

To this end, in one of its aspects, the invention provides an improved additive lamphouse utilizing the principle of dispersion instead of dichroics at the point of diffraction. The amount of dispersion is dependent upon the wavelength of the light; the longer the wavelength the greater the angle of dispersion.

The invention provides an additive lamphouse for use in printing a contact print which comprises a light source emitting light, a diffraction means adapted to diffract the emitted light, a first focussing means adapted to focus the diffracted light to form a spectrum, a second focussing means placed near the spectrum adapted to focus the diffracted light to a subsequent position where a contact print is to be made, an attenuation means at the spectrum adapted to selectively attenuate the spectrum and a holding means adopted to hold a film and a contact print upon which the attenuated and focussed light falls.

In another of its aspects, the invention further provides a method of producing a contact print which comprises diffracting light emitted by a source by a diffraction means, focussing the diffracted light to form a spectrum, imaging the focussed light to a subsequent position for printing the contact print, selectively attenuating the diffracted light at the spectrum, exposing the negative and the contact print in the subsequent position for printing and developing the contact.

In a further object, the device includes a second selective attenuation means placed near to and subsequent to the diffraction means for selectively attenuating the diffracted light, thus forming an image plane of this second selective attenuation means wherein the negative and contact are placed.

DESCRIPTION OF THE PREFERRED EMBODIMENTS

It is to be understood that the novel feature of the present device may utilize any dispersion means. The preferred embodiment of this device utilizes a diffraction means as the dispersing element and reference will now be made to a device utilizing a diffraction means.

Figure 3:
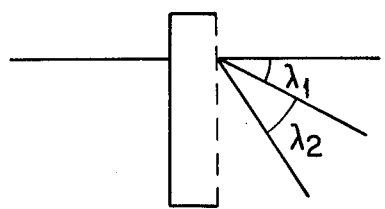
FIG. 3 is a schematic representation of the principle of a diffraction grating.

The simplest form of a diffraction grating is a set of parallel lines or grooves as seen in FIG. 3. The light is diffracted at the lines or grooves depending upon the wavelength; the longer the wavelength, ie. the red, the greater the angle of diffraction will be.

When a collimated or parallel beam of white light is directed through a diffraction grating and then a lens, a spectrum is produced. The grating itself may be "blazed" to produce preferentially the maximum light in a particular order if desired.

The spread or the dispersion angle of the light emerging from the diffraction grating can be calculated according to the following drawing and equation:

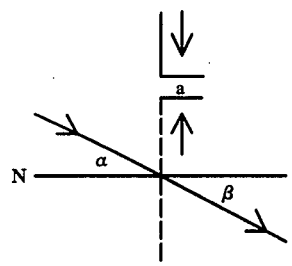

wherein
$\lambda$ represents the wavelength of the light
$a$ represents the grating spacing
$m$ represents the order $0\pm 1\pm 2$ etc.

$$\sin \alpha + \sin \beta = m\lambda/a)$$

Thus, if the incident beam is normal to the grating, then $$\alpha = 0.$$

In the first order, where $M + \pm 1$, $$\sin \beta = \lambda/a$$

Thus, the angle $\beta$ changes as $\sin -1\lambda/a$ or the wavelength of the light. For small angles, this is approximately in direct proportion to $\lambda$.

If a line or slit source of light is used and is collimated by a first lens onto the diffraction grating, the beam will be deviated by the diffraction grating dependent upon the wavelength. The beams are then brought to a focus by a second lens forming a set of slit images of the spectrum of the source is each wavelength.

The resolution depends upon the width of the slit. A large slit width means that each wavelength has considerable overlap and the colours are partially integrated or mixed.

The diffraction gratings may be both of the reflection or the transmission type and the same application is applicable.

For multiple orders, the following occurs: when $m = 0$.

$$\sin \alpha + \sin \beta = 0$$

$$\sin \alpha = \sin \beta$$

$$\alpha = \beta$$

Thus, there is no dependence upon the wavelength and the light remains white.

$$\text{when } m = 1, \sin \alpha + \sin \beta = -1\lambda/a$$

$$\text{when } m = -1, \sin \alpha + \sin \beta = -1\lambda/a$$

Similarly, the same equation is applicable for all orders of $m$ limited by $\sin \beta = 1$.

It has been found that blazed gratings put up to 70% of the total light into a single order (usually $m = +1$).

Thus, when a collimated beam of white light is passed through a diffraction grating followed by a lens, a spectrum is produced.

Figure 4A:
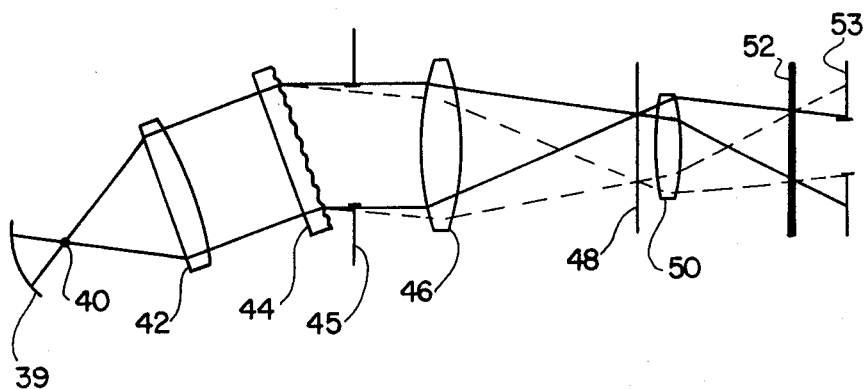
FIG. 4(a) is a plan view of the device of the present invention.
Figure 4B:
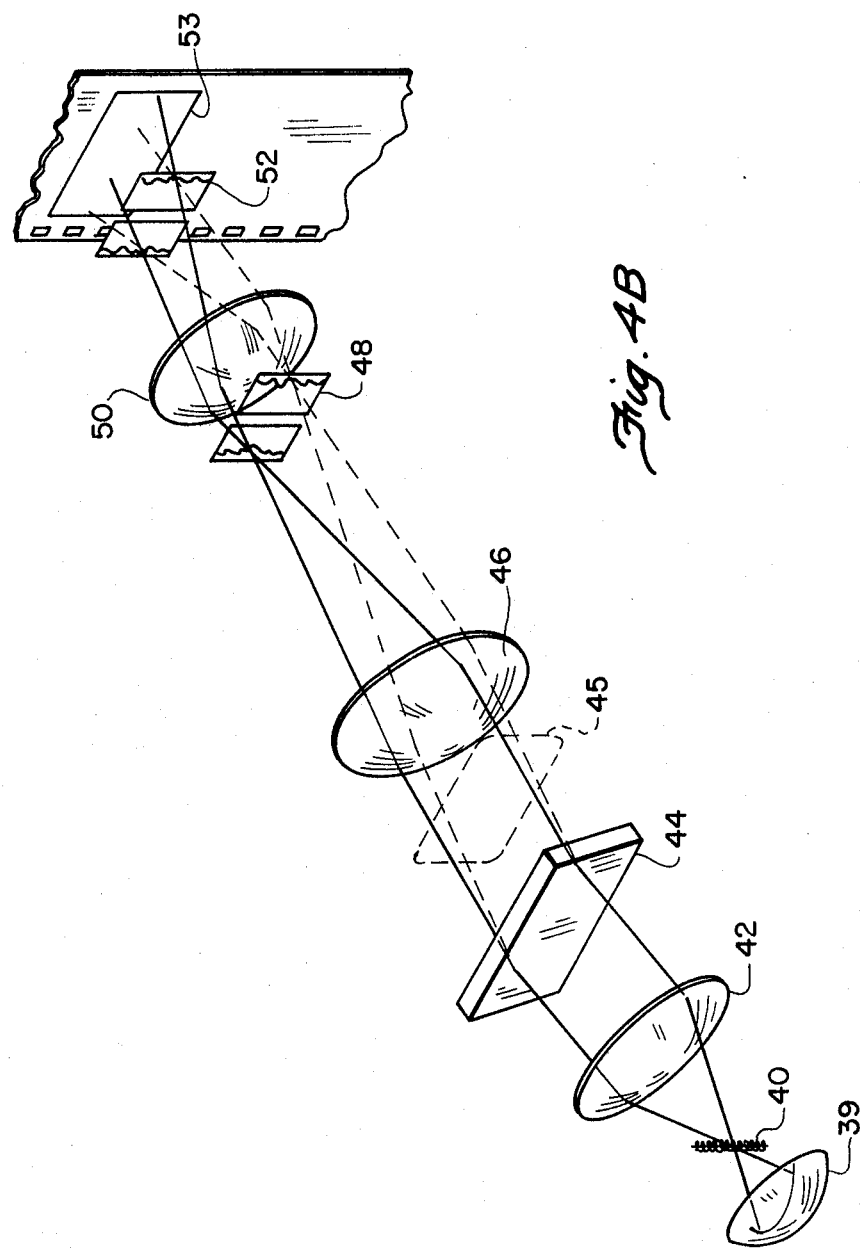
FIG. 4(b) is an isometric view of the device of the present invention.

The inventor has designed an improved device based on the principles shown in FIG. 4 (FIG. 4(a) being a plan view and FIG. 4(b) being an isometric view of the device of the present invention).

Light source 40 emits white light which is collimated through collimating lens 42 and which passes through a diffraction grating 44. The light is then diffracted by the grating 44 based upon its wavelength. (The red light is represented by the dotted lines and the blue light is represented by the solid lines). The diffracted light passes through a focusing lens 46 which produces a spectrum at point 48. A field lens 50 placed close to the spectrum forms an image of the grating 44 at point 52. As the light which was incident to the grating 44 was white, so too is the light at point 52 also white.

The inventor has further found that if the spectrum at point 48 is selectively attenuated; that is, the selective removal of a particular colour or colours by means of a device such as an opaque screen, then only the remaining colours will be transmitted to point 52 thereby producing as uniformly coloured image of the grating at point 52. The result therefore is a uniform image of integrated desired colours at point 52. This device may be referred to as a spectrum aperture which is placed coincident with the spectrum at 48 for purposes of attenuation.

The spectrum aperture or the attenuation means which is placed coincident with the spectrum 48 for purposes of attenuation of the spectrum behaves like a variable transmission filter. Removal of a complex or a simple portion of the spectrum by a device such as a shaped screen will produce any desired colour or hue. The attenuation means may be of any known light attenuating devices, including but not restricted to opaque masks, filter material, small mirror surfaces to reflect unwanted parts of the spectrum to other planes, or electro-optic, accoustic-optic, modulators or polarizing media.

It is important to remember that lens 42, grating 44 and lens 46 must be such as not to vignette any of the rays passing through the stop.

A mirror 39 (FIGS. 4(a) and 4(b)) may be used to image the source 40 upon itself to increase the light transmitted through the spectrum. This mirror 39 may be used if a lower exposure time is required but the mirror is not essential to the device.

The principal of vignetting will now be explained with reference to FIG. 6.

Rays from the object 102 on the axis 104 pass through the stop 106 and are focussed by the lens 108 to form the image 110. Rays from the field 112 pass through the stop 106 and are focussed at the image point 114. In the case shown in FIG. 6, vignetting of the bottom rays from the field point occurs because the lens is not large enough in diameter.

It is therefore important in an optical design to specify the size of the stop and its position as well as the lens. The stop not only determines the image brightness due to vignetting but also determines through which part of the lens the ray bundle passes, thus affecting the aberration balance.

It is also possible to omit lens 42 (shown in FIG. 4) and to include its power in lens 46 or vice versa. In the former case, the grating will be in a diverging beam and in the latter case, in a converging beam.

A second control feature introduced by the present invention is the use of the stop 45 (FIGS. 4(a) and 4(b)). A stop 45 may be placed in a position close to but after the grating 44 but not at the grating itself or at a lens surface. In this embodiment, the image of the stop 53, (explained hereinafter) is used as the plane for illumination of the film, and therefore it is important that it be uniformly illuminated and uniformly coloured. Also, if the stop were placed at a lens or at the grating, any dust, blemishes or other defects in the lens or grating would be reproduced at the stop image.

As stated before, the stop may be placed in any position close to but after the grating. If the stop is in front of the grating, then it appears subsequently to be a multiplicity of stops in each colour or wavelength. If the stop is placed after the grating, then it appears as a single stop provided that the grating is large enough to completely fill the stop with light in all colours, that is, the grating should not vignette the light which passes through the stop.

The stop itself may be an actual physical aperture stop or it may be an image of a stop placed at a conjugate plane in the system.

The dispersing element is shown as a transmission element and may be a plane grating, a prism, a prism assembly or a combination of a grating and a prism. It may also be a reflection system comprising a combination of gratings, prisms and/or mirrors.

The source 40 may comprise a line source producing line images in each colour forming a rectangular spectrum or it may be a compact or a nominal point source producing point images forming a linear or relatively thin rectangular spectrum.

The source 40 may be the filament or arc of a lamp or a slit which is illuminated by a lamp or a lamp and condenser, provided it has an output which ensures that all points in the source illuminate the full aperture of the stops.

The shape of the source determines the subsequent method of control over the spectrum.

When the stop is placed at point 45 (FIGS. 4a and 4b) in front of the lens 46, a uniformly coloured image of the stop is formed at point 53. Thus, the stop image at point 53 is a function of the stop at point 45. If all points of the spectrum are formed from the light which fills the stop, then all points in the spectrum fill the stop image. Thus, any attenuation or masking of any point in the spectrum will change the colour of the stop image uniformly.

Two examples of spectrum attenuators are illustrated in FIG. 5A and FIG. 5B. In FIG. 5A, the spectrum attenuator has three vertical knife edges which attenuate one red, green and blue parts of the spectrum respectively. Thus, a three colour attenuation occurs.

FIG. 5B illustrates a spectrum attenuator comprising a slide with a shaped aperture adapted to selectively attenuate all the desired wave lengths. Thus, an infinitely variable filter can be designed to attenuate any desired combination of wave lengths.

An example of this colour control is as follows. If a masking is used which blocks the transmission of the red light and transmits both green and blue, a cyan colour stop image is produced. Thus, subtracting red and adding green and blue produces the secondary colour cyan. The following chart shows the results of adding and subtracting the primary colours.

| Primary Colours | | | Secondary Colours |
|---|---|---|---|
| red | green | blue | result |
| − | + | + | cyan |
| + | − | + | magenta |

-continued

| Primary Colours | | | Secondary Colours |
|---|---|---|---|
| red | green | blue | result |
| + | + | − | yellow |

One can clearly see that selective attenuation of all of the colours of the spectrum allows the operator to carefully control the colour produced at the stop image.

When a contact print is produced, the contact and the original are placed in the stop image plane in contact with each other at point 53. The controlled beam at this stop image position is used to illuminate the film and expose the print for reproduction.

The contact to be printed may be held at point 53 by any means well known in the art. Two basic holding means particularly useful in the present invention include the "glass plate sandwich" (for stationary exposure) and the "roller system" (for moving exposure).

The "glass plate sandwich" holding means comprises two plates of glass with a contact and the original therebetween thus forming a sandwich. The plates may be laid flat on a flat surface and gravity will hold the means stationary, or, the means may be disposed vertically and inserted into any suitable metallic frame, which holds the device in the area of illumination.

The "roller system" may be used for a moving contact and original. The original and contact are each driven by a series of sprocketed rollers wherein the sprockets engage the contact and the original on the outer peripheral edges in complimentary recesses. The original and contact driven into contact with each other in the area of illumination and are then separated by a second series of sprocketed rollers. The original and the contact move at the same speed and are held together by the tension in the film drive, and the sprockets on the ends of the roller engage the recesses in the film to maintain registration. The contact area is not restricted to a frame size as it is moving and the exposure is constant.

The invention of the present application has been described utilizing a transmission diffraction grating. However, these gratings have been described only because of the convenience of optical design. The device of the present application may utilize other optical devices than transmission diffraction gratings as follows.

Reflection gratings may also be used in the device of the present application but if they are used, the apertures and the longitudinal distances would have to be increased.

Prisms may also be used to disperse the light to form the desired spectrum. The principle of a refractive index of the glass is utilized to produce the desired spectrum and not the diffraction principle of the grating. The use of a prism is governed by Snells' law which provides $$\sin i = n \sin r$$

wherein $i$ is the angle of incidence $n$ is the refractive index of the glass, and
$r$ is the angle of refraction.

As $n$ increases with decreasing wavelengths, for any given angle of incidence, the angle of refraction will increase accordingly. Thus, the colours are dispersed in the opposite order to the order of dispersal with a grating.

A prism will however perform the same basic function as the grating. But, in this case, the separation of the colours is dependent on the type of glass and the prism angle and generally, is much smaller than that when a grating is used.

If the device were designed using a prism, then the line source would have to be relatively narrow in order to maintain resolution and colour separation. The spectrum would be relatively narrow making subsequent control at that position less convenient.

It is possible to utilize more than one prism and therefore the dispersion of the light may be increased.

The prism is more efficient than the grating as all the light is in one spectrum and there are no "orders".

A comparison of the features of the prism vis-a-vis a grating may be made as follows:

| | Gratings | | Prism | | |
|---|---|---|---|---|---|
| | Reflection | Transmission | Multiple | Double | Single |
| efficiency | 60–70% | 60–70% | depends on numbers | 90% | 95% |
| dispersion | $n = 1$ depends on spacing of lines large or small | $n = 1$ | depends on glass dispersion relatively small | | |
| design constraints | compact | | less compact size and weight increase | | |

The contact may be developed in any manner well known in the prior art. The method adapted will of course depend upon what the contact is, that is, whether it is a contact print sheet, negative, slide etc.

Although the disclosure describes and illustrates a preferred embodiment of the invention, it is to be understood that the invention is not restricted to this particular embodiment.

What I claim is:

1. An additive lamphouse for use in printing a contact print comprising:
   (a) a light source emitting light;
   (b) a diffraction means adapted to receive said emitted light and to diffract said emitted light;
   (c) a stop placed close to but after said diffraction means and not coincident with any lens in said lamphouse, said stop adapted to receive said diffracted light from said diffraction means;
   (d) a first focussing means adapted to receive said light from said stop and to focus said diffracted light to form a spectrum, said first focussing means placed close to said diffraction means and subsequent to said stop;
   (e) attenuation means at the spectrum adapted to selectively attenuate the spectrum;
   (f) a second focussing means placed near the spectrum and adapted to receive and to focus said attenuated light to a subsequent position where a contact print is to be made, said second focussing means adapted to produce an image of the stop in a plane subsequent to and in the optical axis of said second focussing means; and
   (g) a holding means adapted to hold a film and a contact print in contact therewith, upon which the attenuated and focussed light falls.

2. The additive lamphouse as claimed in claim 1 wherein said light source is an arc source.

3. The additive lamphouse as claimed in claim 1 wherein said diffraction means is a diffracting grating.

4. The additive lamphouse as claimed in claim 3 wherein said grating is blazed.

5. The additive lamphouse as claimed in claim 1 wherein said diffraction means is a plane reflection grating.

6. The additive lamphouse as claimed in claim 1 wherein said stop is a physical stop.

7. The additive lamphouse as claimed in claim 6 wherein said physical stop is a mask.

8. The additive lamphouse as claimed in claim 6 wherein said physical stop is a screen.

9. The additive lamphouse as claimed in claim 1 wherein said attenuation means at the spectrum is an optical attenuation.

10. The additive lamphouse as claimed in claim 9 wherein said optical attenuation is an electro-optic attenuation.

11. The additive lamphouse as claimed in claim 9 wherein said optical attenuation is an accoustic-optic attenuation.

12. The additive lamphouse as claimed in claim 9 wherein said optical attenuation is a modulator.

13. The additive lamphouse as claimed in claim 9 wherein said optical attenuation is a polarizing media.

14. The additive lamphouse as claimed in claim 1 wherein said first focussing means is a simple focussing means.

15. The additive lamphouse of claim 1 wherein said first focussing means is a compound focussing means.

16. The additive lamphouse as claimed in claim 15 wherein said compound focussing means comprises a combination of lenses placed in front of and subsequent to said diffraction means.

17. The additive lamphouse of claim 16 wherein the size of the lenses does not vignette any emitted light, thereby fully illuminating the film plane aperture with all colours.

18. The additive lamphouse as claimed in claim 1 wherein said contact print is film stock.

19. The additive lamphouse as claimed in claim 1 wherein said stop is an image of a stop placed in a conjugate plane.

20. The additive lamphouse as claimed in claim 1 wherein said holding means is placed in the plane of the image of the stop.

21. The additive lamphouse as claimed in claim 1 further including a collimating lens adapted to collimate the emitted light prior to said light passing through the diffraction means.

22. The additive lamphouse as claimed in claim 1 wherein said light source is a incandescent filament.

23. The additive lamphouse as claimed in claim 1 wherein said light source is a gas discharge element.

24. The additive lamphouse as claimed in claim 1 wherein said diffraction means is a plane transmission grating.

25. The additive lamphouse as claimed in claim 1 wherein said diffraction means is a curved reflection grating.

26. The additive lamphouse as claimed in claim 1 wherein said diffraction means is a prism.

27. The additive lamphouse as claimed in claim 1 wherein said diffraction means is an assembly of prisms.

28. The additive lamphouse as claimed in claim 1 wherein said diffraction means is a combination of gratings and prisms.

29. The additive lamphouse as claimed in claim 1 wherein said contact print is slides.

30. The additive lamphouse as claimed in claim 1 wherein said contact print is photographic paper.

31. The additive lamphouse as claimed in claim 1 wherein said contact print is a negative.

32. A method of producing a contact print comprising:
(a) collimating light emitted from a light source unto a diffraction means;
(b) diffracting said collimated light unto an attenuating means;
(c) selectively attenuating said diffracted light by an attenuation means and transmitting said attenuated light to a first focussing means;
(d) focussing said attenuated light to form a spectrum;
(e) further attenuating said light at said spectrum;
(f) exposing a negative and a contact print to said attenuated light; and
(g) developing said contact print.

33. A method of producing a contact print comprising:
(a) diffracting light emitted by a source by a diffraction means which is adapted to receive said light from said source;
(b) selectively attenuating said diffracted light by a stop subsequent to and near said diffraction means, said stop in the optical axis of said diffraction means;
(c) focussing said diffracted and attenuated light to form a spectrum by a focussing means, said focussing means subsequent and near to said attenuation and in the optical axis of said stop;
(d) selectively attenuating said diffracted light at the spectrum;
(e) imaging said attenuated light by a second focussing means to a subsequent position for printing said contact print whereby an image of the stop is produced in a plane subsequent to and in the optical axis of said second focussing means;
(f) exposing a negative and the contact print in the subsequent position for printing; and
(g) developing said contact print.

34. The method of claim 33 wherein said exposing occurs in the plane of the image of the stop.

35. The method of claim 33 further including the step of collimating said emitted light prior to said diffraction.

* * * * *